US008736103B2

(12) United States Patent
Vicari et al.

(10) Patent No.: US 8,736,103 B2
(45) Date of Patent: May 27, 2014

(54) LOAD CONTROL MODULE FOR A GENERATOR AND METHOD OF OPERATION

(75) Inventors: David Vicari, Lake Geneva, WI (US); Steven Wilcox, Delafield, WI (US); Greg Wischstadt, Wales, WI (US); Jake Thomas, Eagle, WI (US)

(73) Assignee: Generac Power Systems, Inc., Waukesha, WI (US)

( * ) Notice: Subject to any disclaimer, the term of this patent is extended or adjusted under 35 U.S.C. 154(b) by 4 days.

(21) Appl. No.: 13/614,284

(22) Filed: Sep. 13, 2012

(65) Prior Publication Data
US 2013/0009467 A1    Jan. 10, 2013

Related U.S. Application Data

(62) Division of application No. 12/725,964, filed on Mar. 17, 2010, now Pat. No. 8,350,405.

(60) Provisional application No. 61/295,964, filed on Jan. 18, 2010.

(51) Int. Cl.
*H02J 1/00* (2006.01)

(52) U.S. Cl.
USPC .......................................................... 307/23

(58) Field of Classification Search
USPC .......................................................... 307/23
See application file for complete search history.

(56) References Cited

U.S. PATENT DOCUMENTS

| 6,172,432 | B1 | 1/2001 | Schnackenberg et al. |
| 6,510,369 | B1 | 1/2003 | Lacy |
| 7,242,114 | B1 * | 7/2007 | Cannon et al. ............... 307/129 |
| 7,356,384 | B2 | 4/2008 | Gull et al. |
| 2005/0216131 | A1 | 9/2005 | Sodemann et al. |
| 2007/0021874 | A1 | 1/2007 | Rognli et al. |
| 2007/0222295 | A1 | 9/2007 | Wareham et al. |
| 2010/0019574 | A1 * | 1/2010 | Baldassarre et al. ........... 307/23 |

FOREIGN PATENT DOCUMENTS

WO    0137392    5/2001

OTHER PUBLICATIONS

"Technical Manual—RTS Automatic Transfer Switch", 27 pages, undated.
"Instruction Manual—Nexus Remote Monitor", Generac Power Systems, Inc., P.O. Box 8, Waukesha, WI 53187, Revision A, Jul. 23, 2010, 12 pages.
"Instruction Manual—Wireless Display System", Generac Power Systems, Inc., P.O. Box 8, Waukesha, WI 53187, Revision A, Jun. 28, 2010, 16 pages.

* cited by examiner

*Primary Examiner* — Daniel Cavallari
(74) *Attorney, Agent, or Firm* — Boyle Fredrickson

(57) ABSTRACT

A load control module is provided for use with a transfer switch apparatus that controls the delivery of standby electrical power to a load during utility power interruption. The load control module selectively brings loads online to receive standby electrical power to prevent overloading of the electric generator that is providing the standby electrical power. The frequency of the electrical power is also monitored and if a low frequency condition is detected, loads are taken offline (shed). A method to flag those loads that induce an overload condition is also provided.

6 Claims, 11 Drawing Sheets

LOAD CONTROL MODULE FOR A GENERATOR AND METHOD OF OPERATION

CROSS-REFERENCE TO RELATED APPLICATION

This application is a divisional of application Ser. No. 12/725,964 filed Mar. 1, 2010 now U.S. Pat. No. 8,350,405.

CROSS-REFERENCE TO RELATED APPLICATIONS

This application claims the benefit of U.S. Provisional Application Ser. No. 61/295,964, filed Jan. 18, 2010.

FIELD OF THE INVENTION

This invention relates generally to standby electric generators, and in particular, to a control module and method for sequencing the supply of electrical power from the standby electric generator to a plurality of loads to prevent overloading of the generator.

BACKGROUND OF THE INVENTION

As is known, virtually all residential homes utilize electrical power received from a utility company. Typically, utility companies have an excellent record of providing uninterrupted or infrequently interrupted power to their customers at proper voltage levels and line frequency. However, due to the increasing demand for power, power outages have become more frequent. While power outages usually last only for a short duration, an extended power outage may cause more than simple aggravation for customers of the utility. A power outage may render a homeowner's appliances, such as the sump pump, refrigerator, freezer, or air conditioner inoperable.

In order to combat these occasional disruptions in service, many residential customers of the utility companies have equipped their homes with standby electric generator systems. These standby electric generator systems include internal combustion engines that drive electric generators. If the commercial power from the utility company fails, the internal combustion engine of the standby electric generator system is automatically started causing the electric generator to generate electrical power. When the electrical power generated by the electric generator reaches the proper voltage and frequency desired by the customer, a transfer mechanism transfers the load imposed by the homeowner from the commercial power lines to the electric generator.

Typically, the transfer mechanism incorporates switches that isolate the electrical power supplied by the utility company from the generator. In a residential application, the switches are flipped either manually or automatically between the utility source and the generator in order to provide power to the electrical system of the home. These prior art transfer mechanisms transfer the entire electrical system of the home onto the generator. Recent changes to the National Electric Code have mandated that newly installed standby electric generators must be sized to carry the entire load to which the generator may be connected. It can be appreciated that the demands of the entire electrical system of a home can be quite significant. As a result, the generator must be of sufficient size to power the entire electrical system of the home. This, in turn, increases the overall cost of the standby electric generator system for the homeowner.

This can be particularly problematic for homes that have two or more central air conditioners to supply conditioned air to multiple zones within a home. The standby electric generator system must be capable of handling the current demands of both air conditioners if the air conditioners are to be powered in the event utility power has been interrupted. As known in the art, an air conditioner, when actively providing conditioned air, has a relatively large current draw. For those homes having two air conditioner units, the demands on the standby electric generator when both units are operating can be particularly large and, in some cases, may overload the generator. As a result, larger standby electric generators are required for dwellings having multiple air conditioning units.

SUMMARY OF THE INVENTION

The present invention is directed to a control module usable with an electric generator to allow multiple high current demand appliances, such as air conditioners, to be supported without overloading the electric generator. The control module is operative in multiple modes to allow a user limited selectivity in how the control module manages the loading of the electric generator. For example, in one mode, the control module may disable a load during utility power interruption so that the load does not draw any electrical power from the generator. In another mode, the control mode only allows one load at a time to draw current from the generator. In yet another mode, the control mode staggers bringing the loads online, i.e., enabling the loads to draw current from the generator, so that the generator is not overloaded during simultaneous startup of multiple loads that have exceptionally high current draws during startup, such as air conditioner units. In another implementation of the present invention, the loads placed on the electric generator are grouped into multiple groups with the groups each assigned a priority, and the control module brings the groups of loads online based on a preset order of priority. In this regard, the most essential loads are first provided electrical power from the generator during the interruption of utility power before the less essential and non-essential loads. As the loads are brought online, the control module measures the frequency of the electrical power output by the electric generator, and if that frequency has deviated undesirably from a desired frequency, the loads are placed back offline to prevent overloading of the generator. In one preferred implementation, the control module observes preset wait periods after the loads are placed online before the loads are restored to prevent repeated cycling of the loads.

Therefore, it is an object and feature of the present invention to provide a control module that interfaces with a transfer mechanism and selectively controls the supply of standby electrical power to a plurality of loads in a manner to prevent overloading of the standby electric generator providing the standby electrical power.

It is a further object and feature of the present invention to a control module that sequences the delivery of standby electrical power to a pair of central air conditioners to prevent overloading of the standby electric generator providing the standby electric generator.

It is yet a further object and feature of the present invention to provide a control module that can be operated in multiple user-selectable modes.

According to another object and feature of the present invention, a method for controlling the loading on a standby electric generator is provided to prevent overloading of the generator.

It is a still further object and feature of the present invention to provide a transfer mechanism for transferring the electrical power supplied to an electrical load between a utility source and a standby electric generator that may be simply and easily installed.

Other objects, features, aspects, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

The drawings furnished herewith illustrate a preferred construction of the present invention in which the above advantages and features are clearly disclosed as well as other which will be readily understood from the following description of the illustrated embodiment.

In the drawings.

DETAILED DESCRIPTION OF THE DRAWINGS

Figure 1:
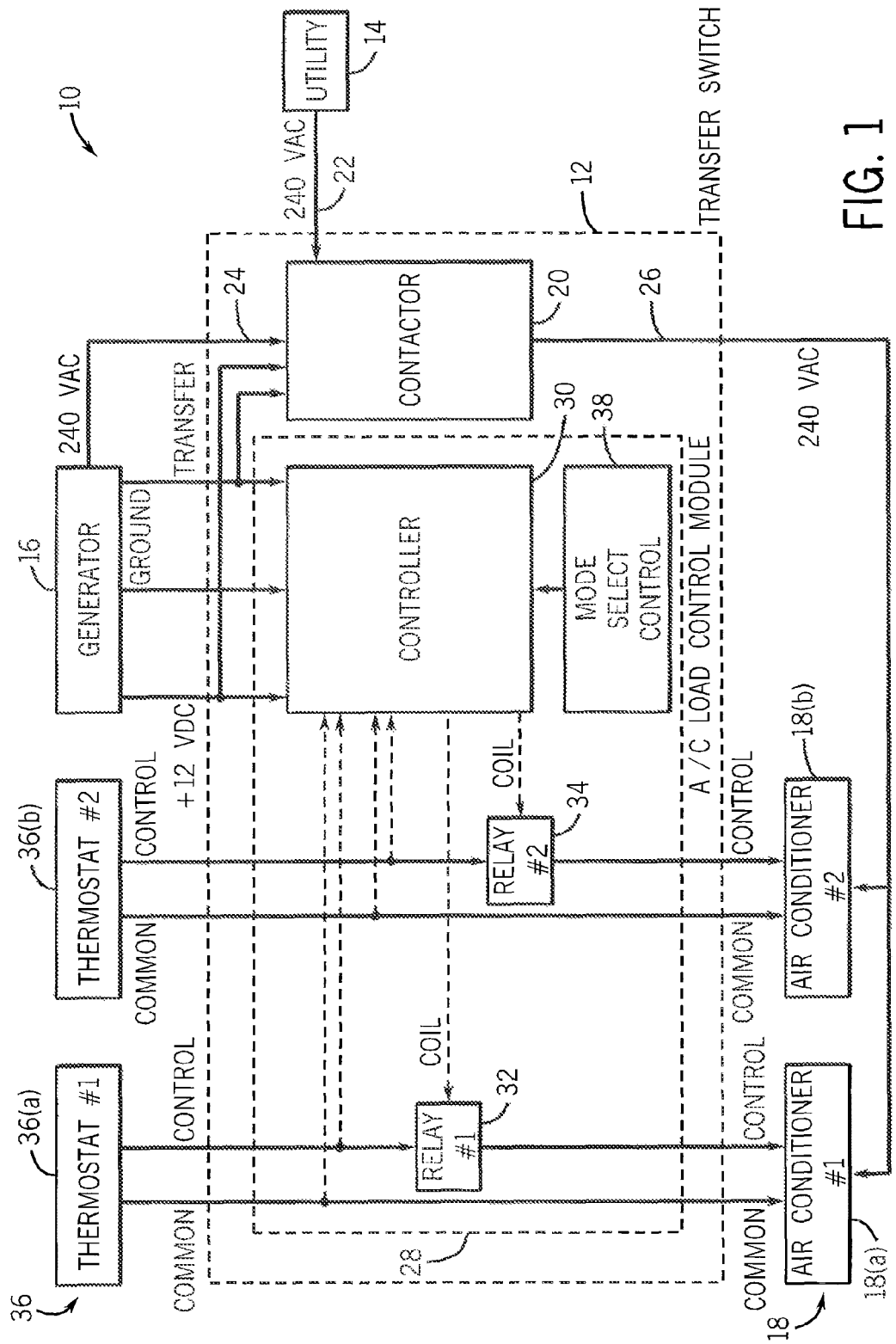
FIG. 1 is a schematic view of a transfer switch apparatus in accordance with one embodiment of the present invention.
Figure 2A:
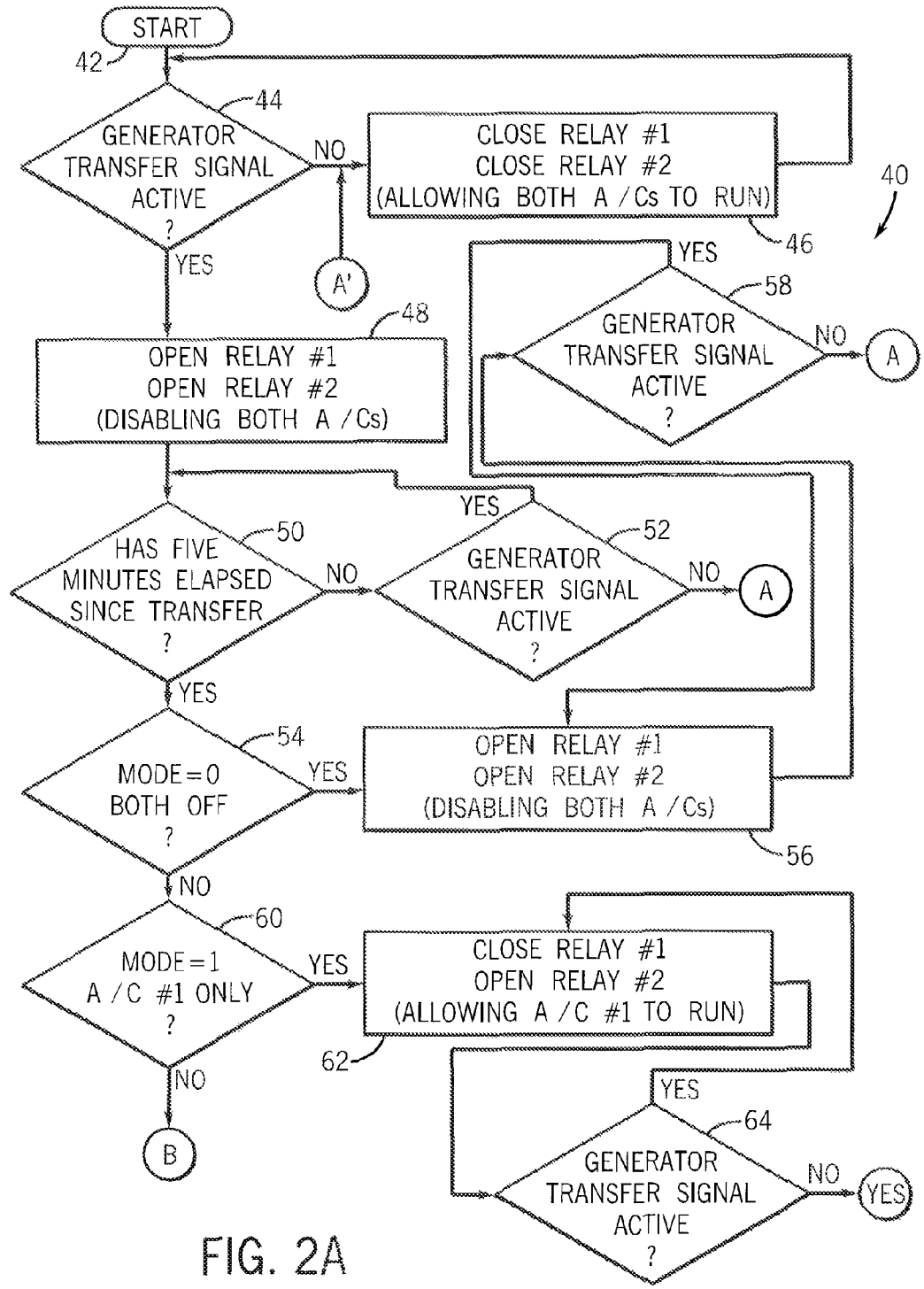
FIGS. 2A-2E illustrate the steps of a load management method for use with the transfer switch apparatus shown in FIG. 1 according to one aspect of the invention.
Figure 2B:
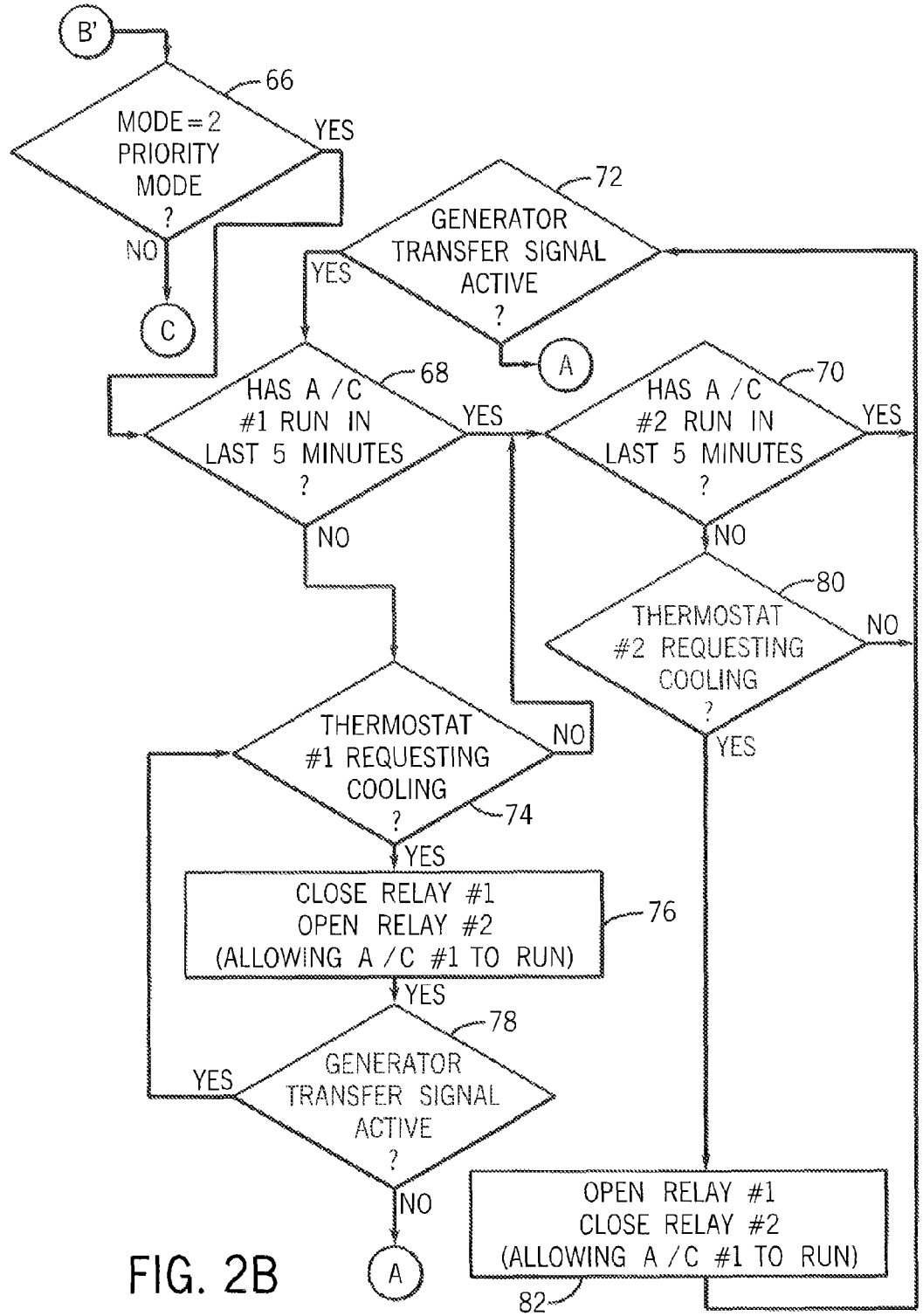
Figure 2C:
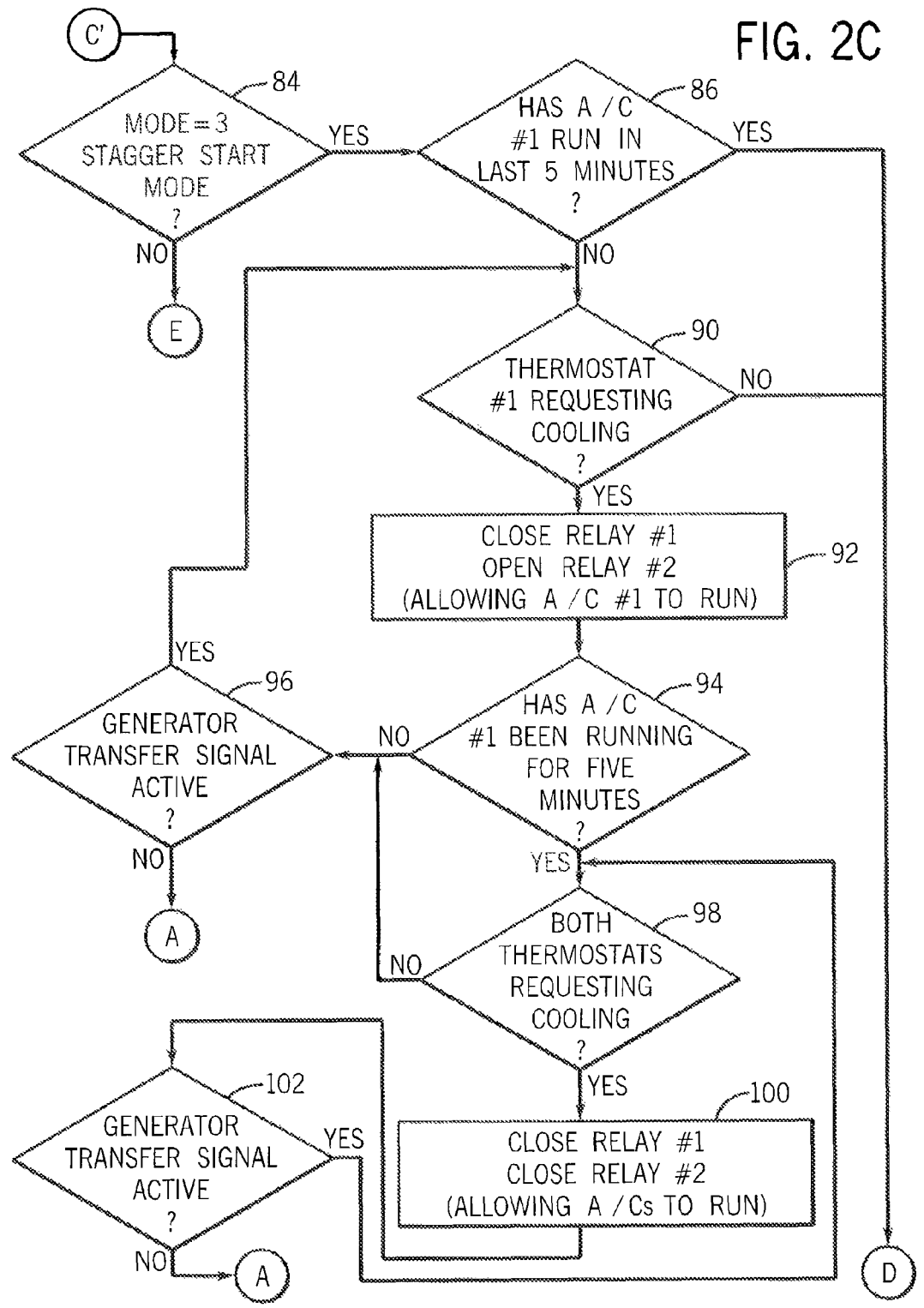
Figure 2D:
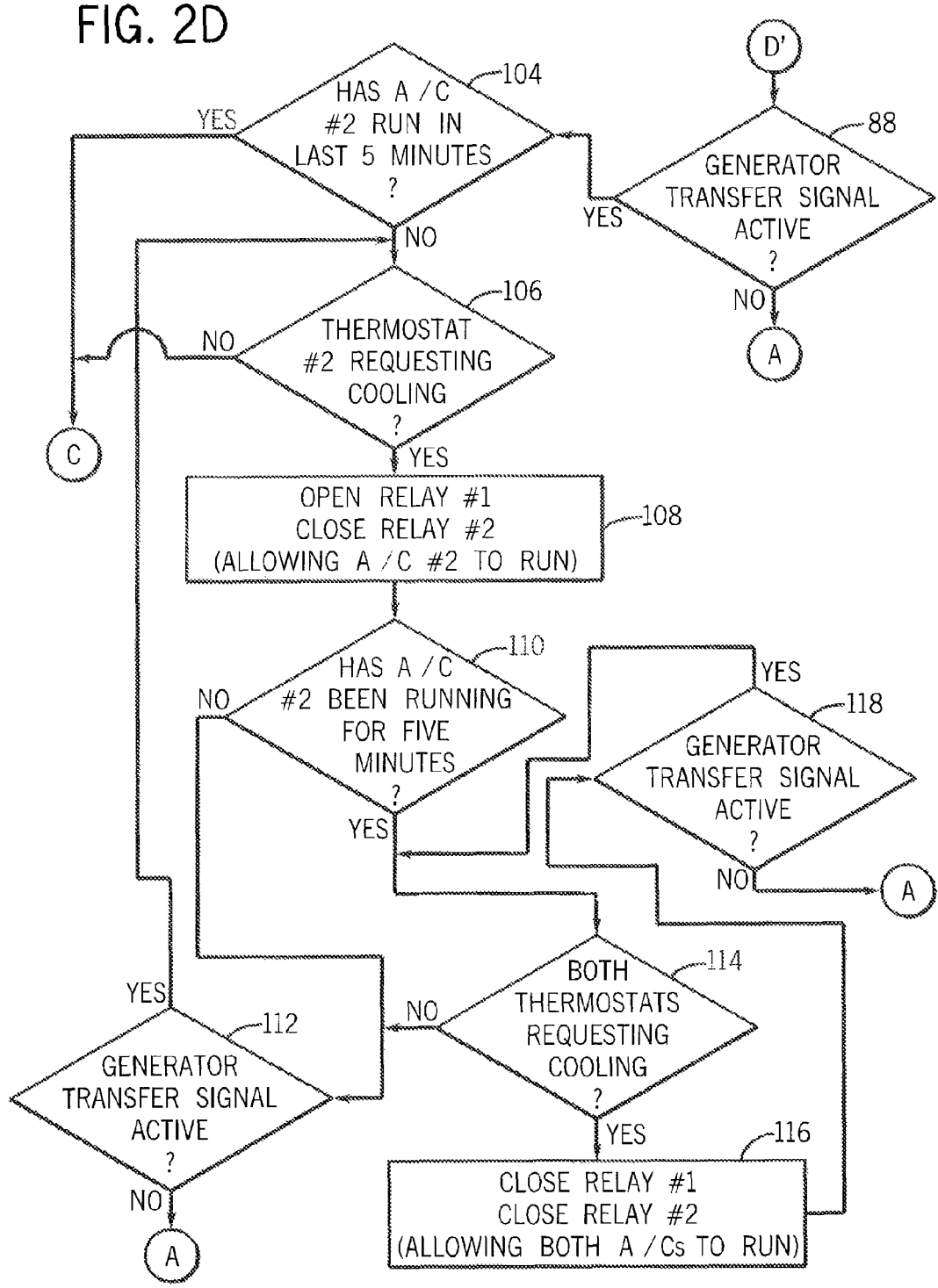
Figure 2E:
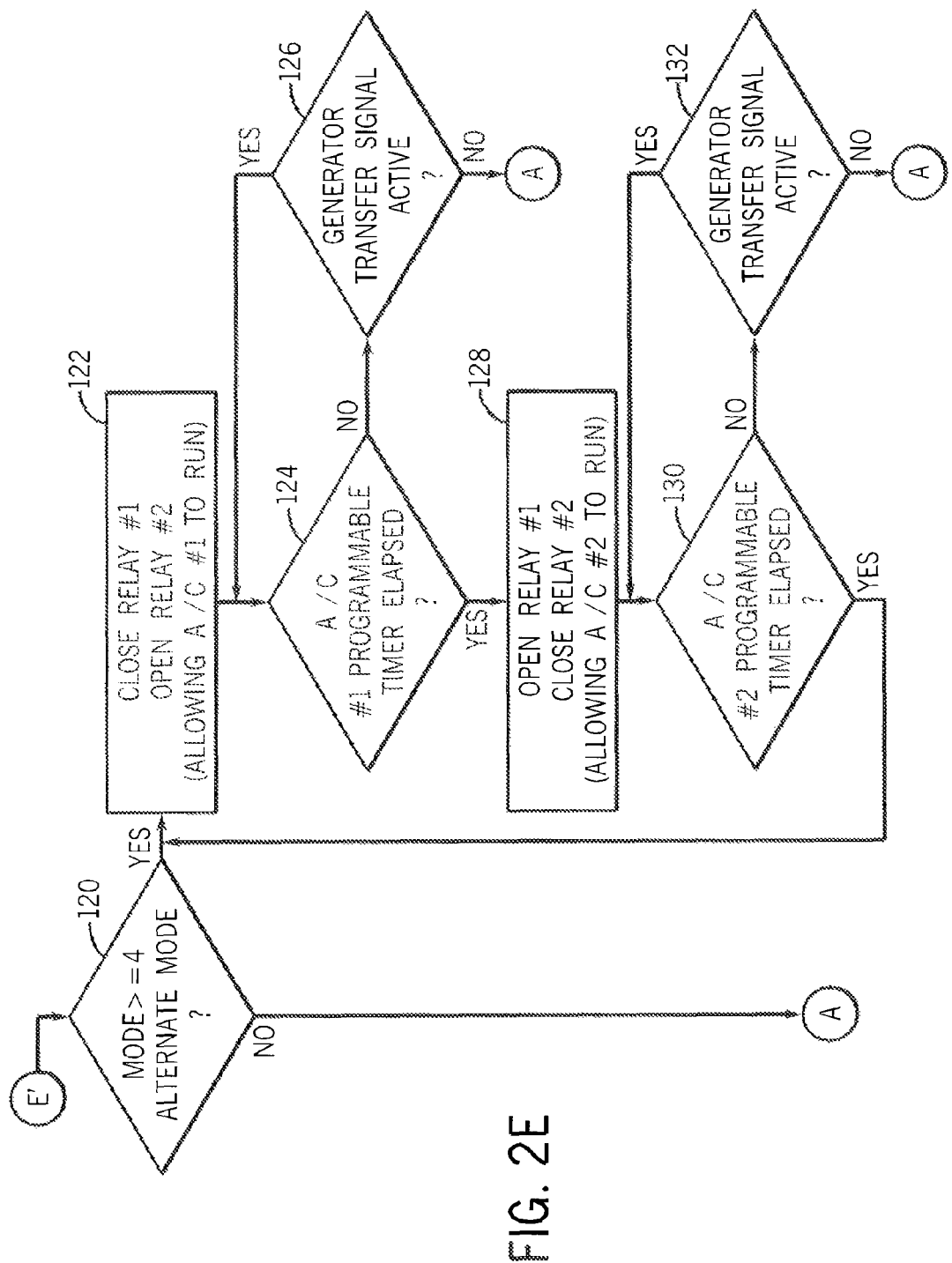

Referring to FIG. 1, a power supply system 10 for providing standby electrical power to a load during primary or utility power interruption includes a transfer switch 12 that is mounted within a housing, cabinet, or the like. The transfer switch 12 is interposed between a primary power supply 14, e.g., utility power grid, and a standby power supply 16, e.g., electric generator. As known in the art, the power supplies may provide 120V or 240V electrical power. In one preferred embodiment, the power supplies provide 240V electrical power for powering larger appliances, such as central air conditioner units 18.

The transfer switch 12 includes a contactor 20 having a utility input 22, a generator input 24, and an electrical output 26. As is conventional, during normal operation, electrical power is available to the loads 18. However, when utility power has been interrupted, standby electrical power is used to power the loads 18. In this regard and as known, the contactor 20 includes movable contacts (not shown) that switchably connect the electrical output 26 to the utility input 22 and the generator input 24. Under normal operation conditions when the utility power supply 14 is providing electrical power, the movable contacts are arranged to conduct electrical power from the utility power supply 14 to the loads 18. In response to a power outage, the generator 16 is actuated and the movable contacts switch positions to electrically couple the loads 18 to the generator 16. In a preferred implementation, a loss of utility power at input 22 is sensed and followed by automatic actuation of the generator 16. Preferably, when utility power is restored, the generator is automatically shutdown to allow the utility power to power the loads 18. An exemplary automatic transfer switch is disclosed in U.S. Pat. No. 6,181,028, assigned to the assignee of the present invention and incorporated herein by reference. The automatic transfer mechanism includes a monitoring system for monitoring the power supplied by the utility power supply. The monitoring system starts the generator in response to power outage from the utility power supply and stops the generator in response to the restoration of power from the utility power supply. In another embodiment, the generator 16 must be manually started to provide standby electrical power.

The transfer switch 12 includes a load control module 28 for preventing overloading of the electrical generator 16 during the interruption of utility power. The load control module 28 includes a controller 30 that controls the functions performed by the control module 28. In this regard, controller 30 includes a central processing unit (not shown) for effectuating the methodology of the present invention. The controller 30 is preferably an 8-bit microcontroller with 1.5 kilobyte flash memory, 72 byes of RAM, and 12 digital I/O ports. In addition to the controller 30, the control module 28 further includes first and second load shed switches 32, 34 that switchably enable and disable loads 18. In one preferred embodiment, switches 32, 34 are relay switches that together with thermostats 36 and control signals provided by controller 30 controls and enable operation of the loads, e.g., air conditioner units 18(a), 18(b). It will thus be appreciated that when relay 32 is closed, thermostat 36(a) is able to command operation of air conditioner unit 18(a). Similarly, when relay 34 is closed, thermostat 36(b) is able to command operation of air conditioner unit 18(b). As will be described further below, the controller 30 is operative in a number of modes to allow operation of air conditioner units 18(a), 18(b) without overloading generator 16. A mode selector 38 is provided to allow a user to select a mode of operation for the load control module 28. In one embodiment, the mode selector 38 is a rotary switch.

The control module is operative in one of five modes regarding operation of the air conditioner units 18(a), 18(b). In a first mode, the controller 30 holds relay switches 32, 34 open to prevent running of the air conditioner units 18(a), 18(b) when the generator 16 is providing power. This first mode is intended when other loads on the generator are too demanding to support running of the air conditioner units. In such an implementation, other loads would be considered more essential than the air conditioning units, such as medical equipment, security equipment, refrigerator, etc.

In a second mode, both relays are initially held open for a predetermined set period of time upon the interruption of utility power and startup of the generator 16. In one preferred embodiment, the set period of time is five minutes in order to prevent a locked rotor condition on the air conditioning units. It is noted that other time periods may be used without deviating from the scope of the present invention. Following expiration of the wait period, relay 32 is closed and relay 34 is left opened. In the second mode, air conditioner 18(a) is allowed to run as normal, i.e., may be thermostatically controlled by thermostat 36(a) and caused to run as demanded by thermostat 36(a). However, since relay 34 is open, air conditioner 18(b) is not permitted to run when utility power is interrupted.

In a third mode, both air conditioners 18(a), 18(b) are permitted to run, but air conditioner 18(a) is given priority over air conditioner 18(b). Accordingly, when utility power is interrupted and the electric generator is activated, both relays 32, 34 are placed in the open position to prevent running of the air conditioners for a preset period, e.g., five minutes. After the waiting period, both relays 32, 34 are closed. If thermostat 36(a) is not requesting operation of air conditioner 18(a) then thermostat 36(b) can request operation of air conditioner

18(*b*). When either thermostat requests operation of its air conditioner, the opposite relay is opened. However, since priority is given to air conditioner 18(*a*), if at any time thermostat 36(*a*) requests operation of air conditioner 18(*a*), the controller 30 provides a command signal to open relay 34 and close relay 32. Thus, priority is given to air conditioner 18(*a*) and both air conditioners 18(*a*), 18(*b*) are not allowed to run at the same time.

In a fourth mode, operation of the air conditioners 18(*a*), 18(*b*) is staggered. In this regard, when utility power is interrupted, the aforedescribed wait period, e.g., five minutes, is observed after opening both relays 32, 34. After the wait period, relay 32 is closed and relay 34 is kept open. This allows thermostat 36(*a*) to request operation of air conditioner unit 18(*a*). After expiration of a delay period, e.g., five minutes, relay 34 is closed to now allow thermostat 18(*b*) to request operation of air conditioner 18(*b*). Thus, both air conditioners can run at the same time but the initial operation of air conditioner 18(*b*) is delayed relative to air conditioner 18(*a*).

In a fifth mode, operation of the air conditioners 18(*a*), 18(*b*) is alternated. In this regard, when utility power is interrupted, the aforedescribed wait period, e.g., five minutes, is observed after opening both relays 32, 34. After the wait period, relay 32 is closed and relay 34 is kept open. The state of the relays is maintained for a preset operating time, e.g., five minutes. This allows thermostat 36(*a*) to request operation of air conditioner unit 18(*a*) for the operating time while preventing operation of air conditioner 18(*b*). After expiration of the operating time, relay 32 is opened and relay 34 is closed to now allow thermostat 18(*b*) to request operation of air conditioner 18(*b*). Thus, both air conditioners are allowed to run but not simultaneously and further, priority is not given to one air conditioner over the other. It will be appreciated that in one embodiment, the fifth operating mode can have multiple sub-modes that vary the operating time. Table 1 provides a summary of the aforedescribed modes, including one exemplary recitation of the operating times when the controller is operating according to the fifth mode. As shown in Table 1, it is contemplated that the run times can vary for each of the air conditioners when in the alternate modes.

TABLE 1

| Mode | Description | A/C 18(a) Time (min) | A/C 18(b) Time (min) |
|---|---|---|---|
| 0 | Both Off | N/A | N/A |
| 1 | A/C 18(a) Only | N/A | N/A |
| 2 | Priority Mode | N/A | N/A |
| 3 | Staggered Mode | N/A | N/A |
| 4 | Alternate | 15 | 15 |
| 4.1 | Alternate | 30 | 30 |
| 4.2 | Alternate | 60 | 30 |
| 4.3 | Alternate | 60 | 60 |
| 4.4 | Alternate | 120 | 30 |
| 4.5 | Alternate | 120 | 120 |

Referring now to FIGS. 2A-2E, the methodology of operation for the control module 28 according to the modes described in the preceding paragraphs is shown. The methodology 40 begins at block 42, and is activated when a generator transfer active signal is detected at block 44. If no signal is detected, the methodology proceeds to block 46 and the controller 30 closes (keeps closed) the relays 32, 34 and loops back to block 44. On the other hand, if a generator transfer active signal is detected, the controller opens both relays 32, 34 at block 48. After both relays have been opened, a five minute wait period is observed at block 50. During the five minute wait period, the controller continues to detect the presence of the generator transfer signal at block 52. If the generator transfer signal is no longer present, the methodology moves to block 46 whereupon both relays are closed to allow both air conditioners to run since utility power has been restored. On the other hand, if utility power remains unavailable, and once the wait period has elapsed, the methodology continues to block 54 whereupon the controller determines its mode of operation, e.g., mode 0, mode 1, mode 2, mode 3, or mode 4.

If the control module has been commanded in the first mode, e.g., mode 0, the methodology proceeds to block 56 whereupon both relays are opened. If the generator transfer signal remains active at block 58, the relays are kept open to prevent the air conditioners 18(*a*), 18(*b*) from being powered by the electric generator. However, if the generator transfer signal is no longer present, the methodology moves to block 46 whereupon both relays are closed with the return of utility power.

If the control module has been commanded to run according to the second mode, e.g., mode 1, as provided at block 60, the methodology closes relay 32 to allow thermostatic control of air conditioner 18(*a*) but holds relay 34 open to prevent running of air conditioner 18(*b*) at block 62. These relay states are maintained if the generator transfer signal remains active at block 64. However, if the generator transfer signal is no longer present, the methodology moves to block 46 whereupon both relays are closed with the return of utility power.

If the control module has been commanded to run according to the third mode, e.g., mode 2, as provided at block 66, the methodology proceeds to block 68 whereupon the controller is caused to determine if the air conditioner 18(*a*) has been caused to run by its thermostat 36(*a*) in the past five minutes. If so, the controller then determines if air conditioner 18(*b*) has been caused to run in the past five minutes at block 70. If so, and if the generator transfer signal is still active at block 72, the methodology returns to block 68. On the other hand, if the generator signal is no longer active, i.e., utility power has been restored, the methodology returns to block 46. If the air conditioner 18(*a*) has not been caused to run in the past five minutes by its thermostat 36(*a*) at block 68, the controller proceeds to block 74 and determines if thermostat 36(*a*) is actively requesting operation of air conditioner 18(*a*), e.g., cooling by the air conditioner 18(*a*). If the thermostat 36(*a*) is requesting cooling from the air conditioner 18(*a*), relay 32 is closed and relay 34 is left opened at block 76. If the generator transfer signal remains active at block 78, the methodology returns to block 74. If utility power has been restored, the methodology returns to block 46. If thermostat 36(*a*) is not requesting cooling from air conditioner 18(*a*) at block 74, the methodology proceeds to block 70. If at block 70 the controller determines that air conditioner 18(*b*) has not run in the past five minutes, an inquiry that is only made if air conditioner 18(*a*) is not actively being caused to run or has not been caused to run in the past five minutes, the controller determines at block 80 if thermostat 36(*b*) is requesting cooling of the air conditioner 18(*b*). If so, relay 32 is opened and relay 34 is closed at block 82, whereupon the controller proceeds to block 72. Similarly, if thermostat 36(*b*) is not requesting cooling from the air conditioner 18(*b*), the controller proceeds to block 72.

If the controller has been instructed to operate according to the fourth mode, e.g., mode 3, as provided at block 84, the controller proceeds to block 86 and determines if the air conditioner 18(*a*) has been run in the past five minutes. If so, the controller proceeds to block 88, FIG. 2E. On the other hand, if air conditioner 18(*a*) has not been running the preceding five minutes, the controller determines if thermostat 36(a) is requesting cooling of air conditioner 18(a) at block 90. If the thermostat 36(a) is not requesting cooling, the controller moves to block 88, FIG. 2E. However, if the thermostat 36(a) is requesting cooling, relay 32 is closed and relay 34 is left open at block 92. The controller then iteratively determines if the air conditioner 18(a) has been running for five minutes at block 94. Until five minutes has passed, the controller continuously determines if utility power has been restored at block 96. If not, the controller loops back to block 90. If so, the controller moves to block 46 whereupon both relays are closed. After the five minutes has elapsed, the controller proceeds to block 98 and determines if both thermostats are requesting cooling. If not, the controller returns to block 94. If so, the controller closes both relays 32, 34 at block 100, which allows both air conditioners 18(a), 18(b) to run at the same time. The controller then proceeds to block 102 and determines if utility power has been restored. If utility power has not been restored, the controller returns to block 98. If utility power has been restored, the controller returns to block 46.

As noted above, when the controller is commanded to operate according to the fourth mode and air conditioner 18(a) has been running for at least five minutes, as determined at block 86, the controller proceeds to block 88, whereupon the controller determines if utility power has been restored. If so, the controller returns to block 46. However, if utility power is still unavailable, the controller determines if air conditioner 18(b) has run in the past five minutes at block 104. If so, the controller returns to block 84. If air conditioner 18(b) has not run in the past five minutes, the controller proceeds to block 106 and determines if thermostat 36(b) is requesting cooling of air conditioner 18(b). If not, the controller returns to block 84. If thermostat 36(b) is requesting cooling, however, relay 32 is opened and relay 34 is closed at block 108. The controller then proceeds to block 110 and determines if the air conditioner 18(b) has been running for five minutes. If not, the controller moves to block 112, determines if utility power has been restored, and returns to block 46 or block 106 accordingly. After air conditioner 18(b) has been running for five minutes, the controller determines if both thermostats are requesting cooling at block 114. If not, the controller loops back to block 110. However, if both thermostats are requesting cooling, both relays 32, 34 are closed at block 116, thereby allowing both air conditioner units 18(a), 18(b) to run. If utility power has not been restored at block 118, the controller returns to block 110. However, if utility power has been restored, the controller returns to block 46.

If the controller has been instructed to operate according to the fifth mode, e.g., mode 4, as provided at block 120, the controller proceeds to block 122 with relay 32 being closed and relay 34 left open, which allows only air conditioner 18(a) to run. The controller then proceeds to block 124 and determines if the programmable timer for air conditioner 18(a) has elapsed. If the timer has not elapsed and utility power has not been restored at block 126, the controller loops back to block 122. However, if the timer has elapsed, relay 32 is opened and relay 34 is closed to now allow air conditioner 18(b) to run at block 128. Air conditioner 18(b) is then allowed to run according to its programmable timer. When its timer elapses at block 130, the controller moves to block 132 and determines if utility power is restored. If not, the controller returns to block 122. If utility power has been restored, the controller returns to block 46.

It will be appreciated that the modes described above are merely exemplary and that the controller may be caused to operate according to other types of modes to prevent overloading of the generator when utility power has been interrupted.

Figure 3:
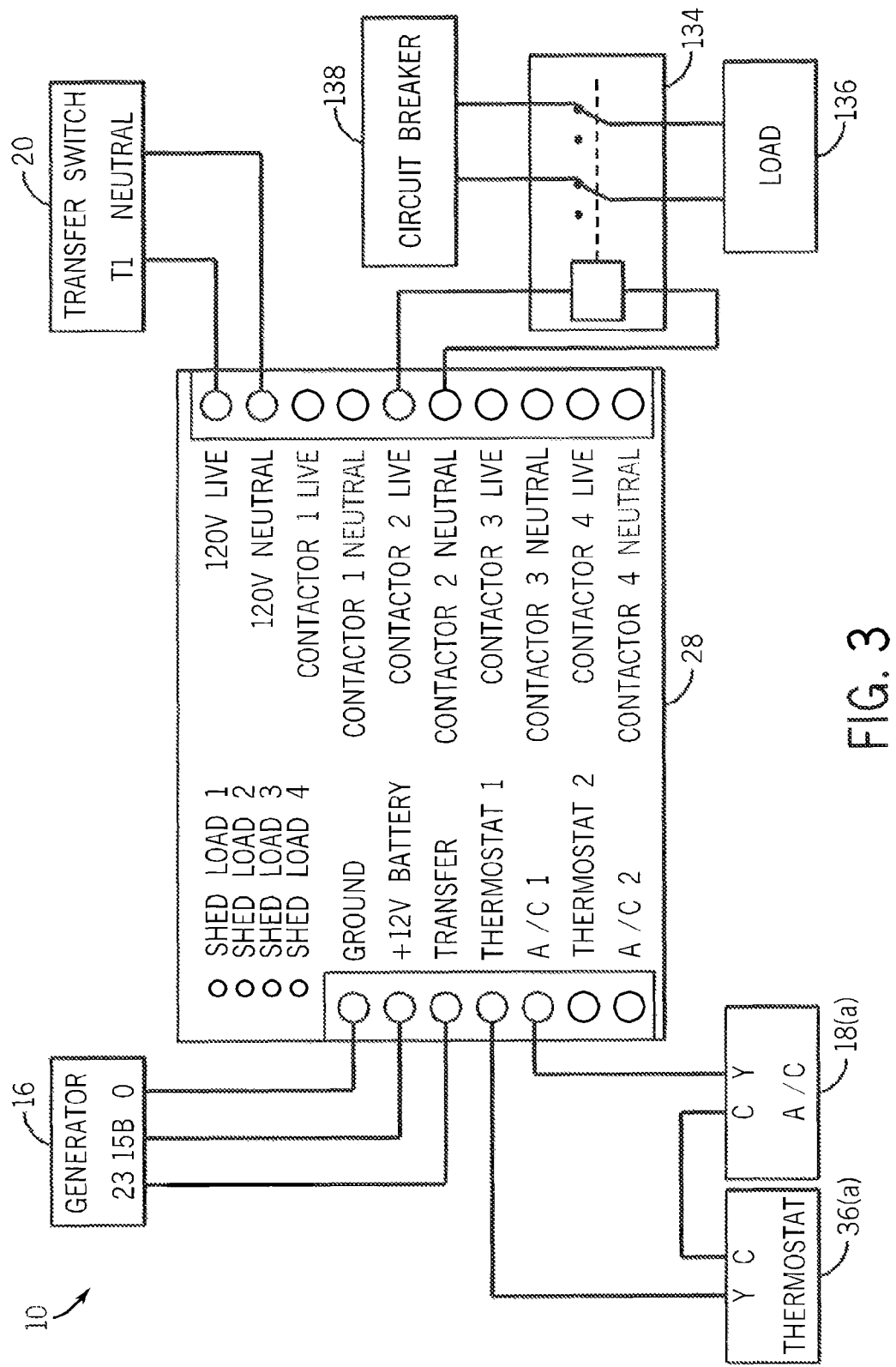
FIG. 3 is a schematic view of a transfer switch apparatus according to another embodiment of the invention.

FIGS. 1 and 2A-2E have been described with respect to a transfer switch apparatus in which standby electrical power is used to power thermostatically controlled central air conditioners when utility power has been interrupted. It is contemplated however that the transfer switch may also control the delivery of standby electrical power to other types of loads instead or in addition to the aforedescribed air conditioners. Such a transfer switch apparatus is illustrated in FIG. 3.

The transfer switch apparatus is similar to that shown in FIG. 1 and, as such, like reference numerals will be used where appropriate. The power management system 10, in addition to the components shown in FIG. 1, includes a contactor 134 that is movable between open (non-conductive) and closed (conductive) positions, controls the flow of electrical power to load 136. For purposes of illustration, only one contactor and load is shown, but it is understood that the system 10 may include multiple contactors and loads. In one preferred embodiment, control module 28 may support control of two air conditioner units 18(a), 18(b) and four other loads 136 and corresponding contactors 134. It will be appreciated that a load may include a branch circuit for conducting electrical power to multiple consumers. Each contactor 134 is interconnected between a load 136 and a circuit breaker 138 for the load. It will thus be appreciated that the circuit breaker 138 provides conventional circuit interrupting functions to protect load 136 but contactor 134 responds to control commands from the control module 28 to prevent overloading of the generator 16 during utility power interruption. In this regard, as shown in FIGS. 4A-4D, the control module performs a load shedding methodology to prevent overloading of the generator. It is understood that the methodology illustrated in FIGS. 4A-4D can be executed in conjunction with the methodology illustrated in FIGS. 2A-2E for controlling operation of the air conditioners 18(a), 18(b).

Figure 4A:
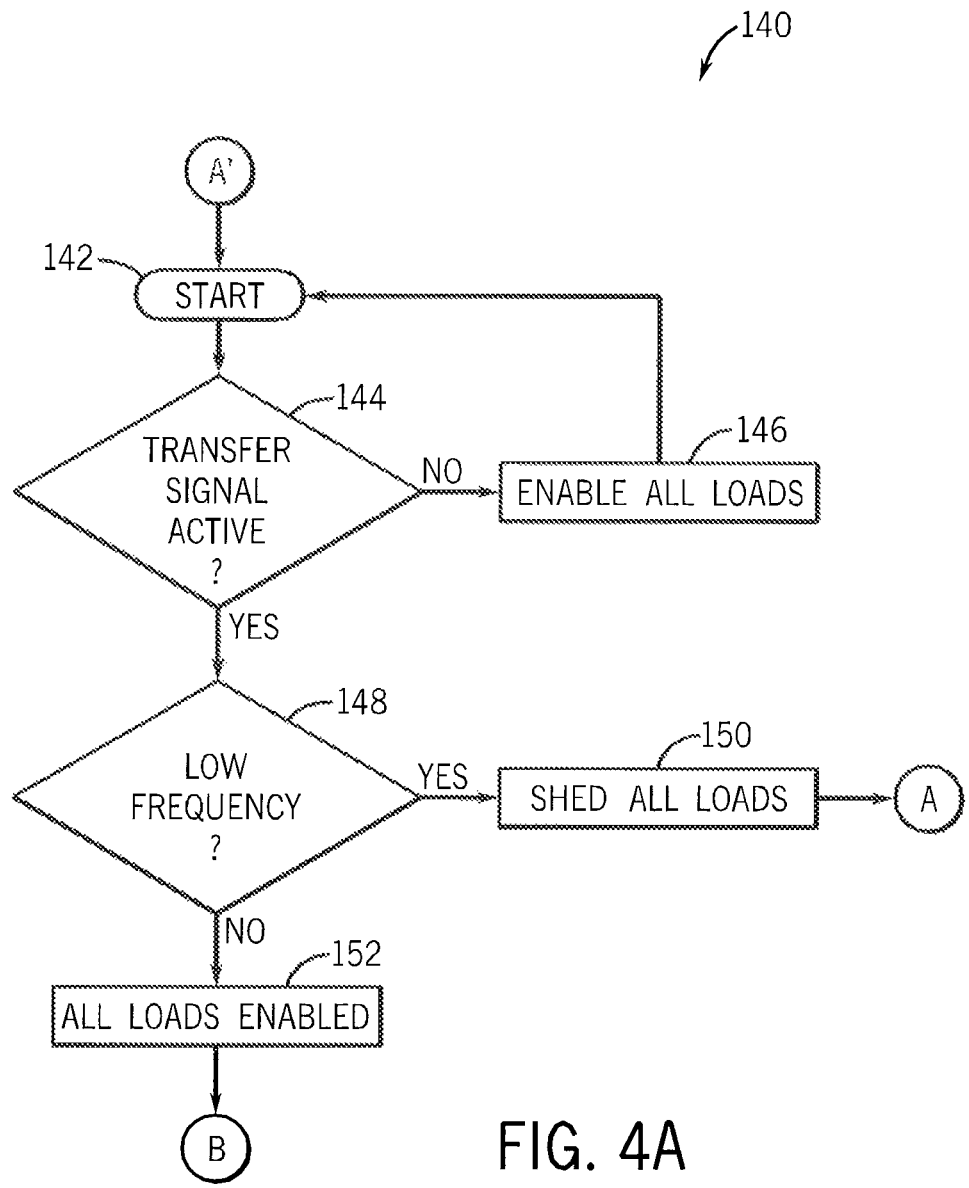
FIGS. 4A-4D sets forth the steps of a load management method for use with the transfer switch apparatus of FIG. 3 according to another aspect of the invention.

Referring now to FIG. 4A, the methodology 140 begins at block 142 when utility power is interrupted and a transfer signal is active at block 144. If a transfer signal is not active signaling that utility power has not been interrupted, the controller enables all loads at block 146, and loops back to block 144 and awaits a loss of utility power. However, if utility power has been interrupted, the controller compares the operating frequency of the generator to a desired frequency at block 148. Specifically, the controller determines if a low frequency condition is present. In one embodiment, a low frequency condition exists if the frequency of the electrical power provided by the generator drops below 58 Hz for more than three seconds or less than 50 Hz for a one-half second. If a low frequency condition is detected, all loads are shed and taken offline at block 150 by providing command signals to the contactors for all the loads causing the contactors to move to their open positions. The controller then returns to block 142.

If a low frequency condition is not detected, the controller proceeds to block 152 with all loads remaining enabled. In an alternative embodiment, all loads are initially disabled for a set period of time after utility power is lost to prevent rotor locking. In one implementation, the wait time is approximately five minutes.

Figure 4B:
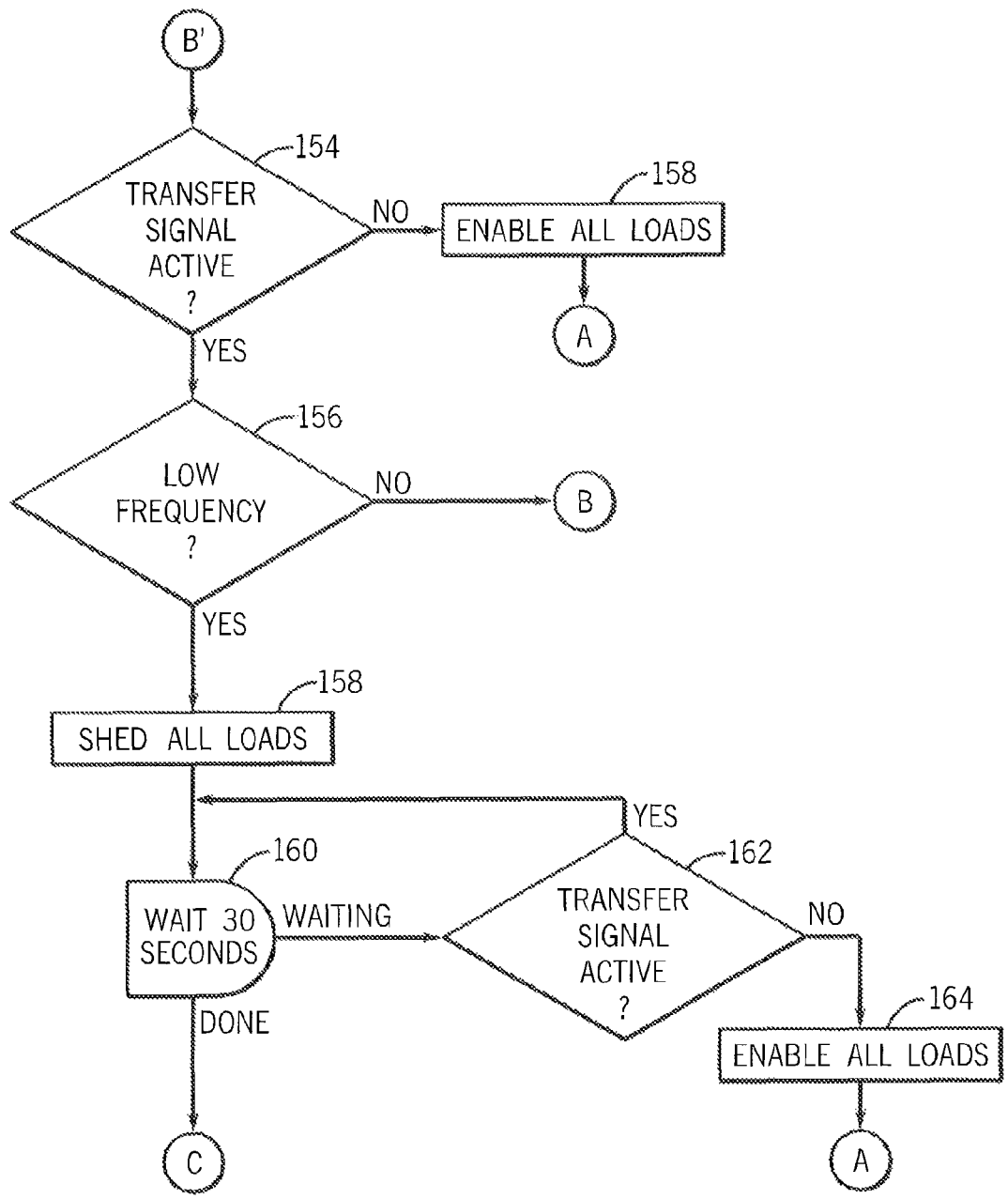
Figure 4C:
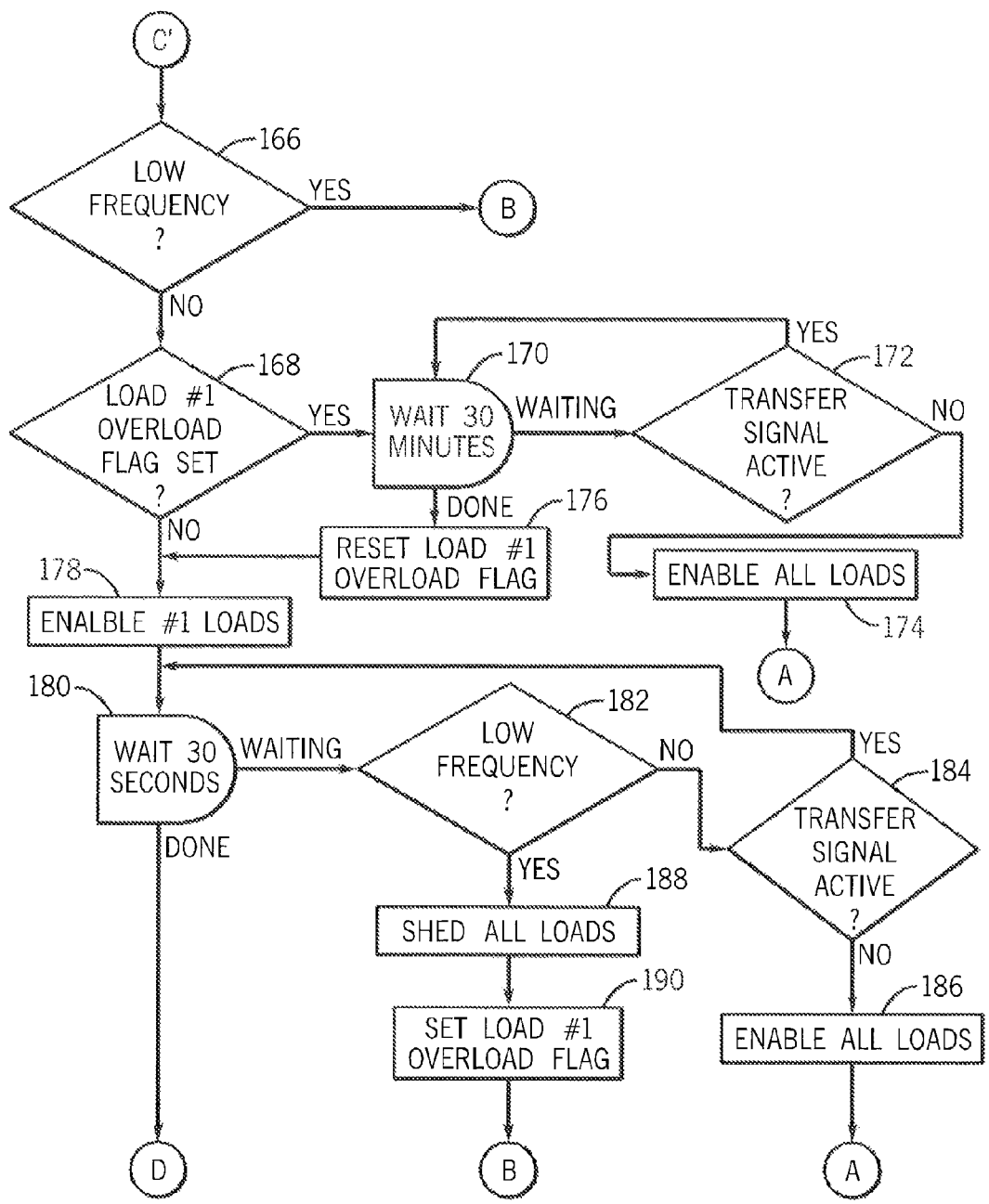

With all loads enabled, the controller proceeds to block 154 of FIG. 4B. If the transfer signal remains active at block 154, the controller checks again the operating frequency of the generator at block 156. If the frequency is acceptable, the controller loops back to block 154. Similarly, if utility power has been restored, the controller keeps all loads enabled at block 158. If a low frequency condition is present, all loads are shed at block 158. After the loads have been shed, the controller observes a wait period at block 160, which in one embodiment is five minutes. During the wait period, if the transfer signal is no longer active at block 162, all loads are re-enabled at block 164. If utility power remains unavailable throughout the wait period, the controller proceeds to block 166, FIG. 4C.

At block 166, the controller again compares the operating frequency of the generator to the desired frequency. If a low frequency condition is present, the controller returns to block 154, FIG. 4B. However, if a low frequency is not present, a first load flag is set at block 168. The controller then observes a wait period, e.g., thirty minutes, at block 170. If during the wait period, utility power is restored at block 172, all loads are enabled at block 174 and the first load flag is reset. If utility power remains unavailable after the wait period has expired, the first load flag is reset at block 176 and the first load is enabled at block 178. During the thirty seconds delay period at block 180, the controller determines if a low frequency condition is present at block 182. If a low frequency condition is not present, the controller proceeds to block 184 and determines if a transfer signal is still active. If utility power has been restored, all loads are enabled at block 186 and the controller returns to block 142. However, if utility power is still unavailable, the controller loops back to block 178. On the other hand, if a low frequency condition is detected at block 182, all loads are shed at block 188 and a first load overload flag is set at block 190. The controller then returns to block 154.

Figure 4D:
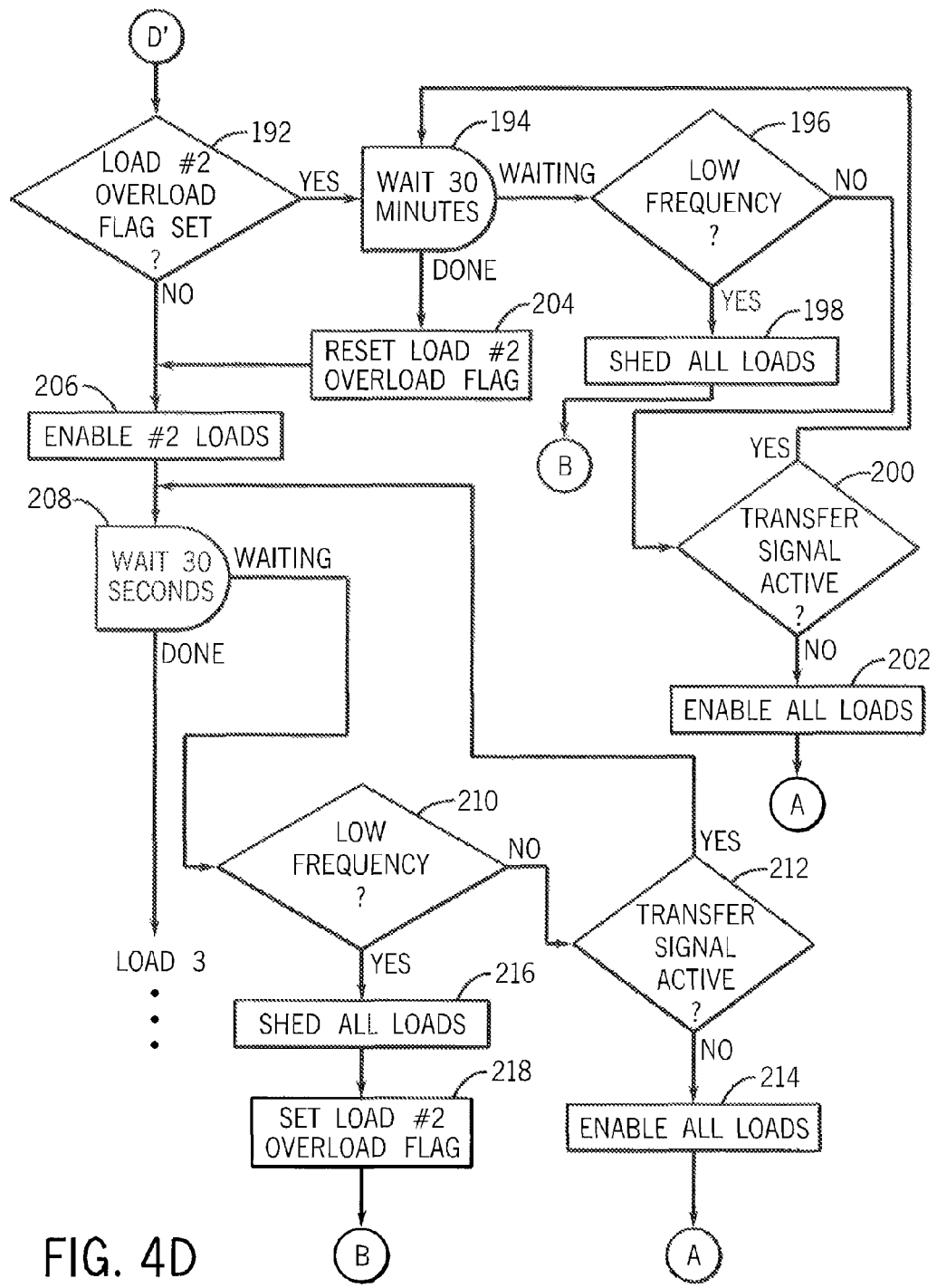

After expiration of the wait period at block 180, the controller proceeds to block 192, FIG. 4D. If the overload flag for the second load is set at block 192, the controller continues to block 194 and waits for a predefined period, e.g., thirty minutes. During the wait period, the controller determines if a low frequency condition is present at block 196. If a low frequency condition is present, all loads are shed at block 198 at the controller returns to block 154. On the other hand, if a low frequency condition is not detected and the transfer signal remains active at block 200, the controller continues to observe the wait period at block 194. If utility power has been restored, the controller enables all loads at block 202 at the controller returns to block 142.

Once the wait period has elapsed, the overload flag for the second load is reset at block 204. Thus, if the flag for the second load is not set at block 192 or if a low frequency condition is not detected when the flag is set, the controller continues to block 206 and enables the second load at block 206. After the second load has been enabled, a thirty seconds wait period is observed at block 208. During the wait period, the controller determines if a low frequency condition is present at block 210. If a low frequency condition is not detected, the controller then determines if the transfer signal is active at block 212, and proceeds to blocks 208 or 214 accordingly. On the other hand, if a low frequency condition is detected at block 210, all loads are shed at lock 216 and the overload flag for the second load is set at block 218. The controller then returns to block 154.

Similar steps are carried out for the additional loads of the transfer switch apparatus, such as third and fourth loads. The steps are carried out following observance of corresponding wait periods, such as was observed at blocks 180 and 208. In this regard, after the wait period at block 208 has expired, the controller continues to execute steps similar to those of blocks 192-218 for the third, fourth, fifth, etc. loads.

It will be appreciated that the wait periods and the steps that are carried out during the wait periods allow the controller to determine which loads are causing overloading of the generator and suitable flags may be set. The flags may be associated with suitable human discernable alerts to signal a homeowner or other user that certain loads are causing overloading of the generator. Table 2 is a sequence diagram reflective of the states of first, second, third, and fourth loads that may occur when the third load repeatedly causes an overload condition on the generator. As provided in the table, the loads are arranged into four groups, in descending order of priority. Additionally, the first two groups include an air conditioner and a contactor, while the third and fourth groups only include contactors.

TABLE 2

| | Sequence | | | | | |
|---|---|---|---|---|---|---|
| | #1 Loads | | #2 Loads | | #3 Loads | #4 Loads |
| | A/C | Contactor | A/C | Contactor | Contactor | Contactor |
| Utility Power | Enabled | Enabled | Enabled | Enabled | Enabled | Enabled |
| Power Outage | Enabled | Enabled | Enabled | Enabled | Enabled | Enabled |
| Generator Start | Enabled | Enabled | Enabled | Enabled | Enabled | Enabled |
| Running Normally | Enabled | Enabled | Enabled | Enabled | Enabled | Enabled |
| Low Frequency | Locked Out | Locked Out | Locked Out | Locked Out | Locked Out | Locked Out |
| Wait 5 Minutes | Locked Out | Locked Out | Locked Out | Locked Out | Locked Out | Locked Out |
| Enable #1 Loads | Enabled | Enabled | Locked Out | Locked Out | Locked Out | Locked Out |
| Wait 30 Seconds | Enabled | Enabled | Locked Out | Locked Out | Locked Out | Locked Out |
| Enable #2 Loads | Enabled | Enabled | Enabled | Enabled | Locked Out | Locked Out |
| Wait 30 Seconds | Enabled | Enabled | Enabled | Enabled | Locked Out | Locked Out |
| Enable #3 Loads | Enabled | Enabled | Enabled | Enabled | Enabled | Locked Out |
| Low Frequency | Locked Out | Locked Out | Locked Out | Locked Out | Locked Out | Locked Out |
| Wait 30 Seconds | Locked Out | Locked Out | Locked Out | Locked Out | Locked Out | Locked Out |
| Enable #1 Loads | Enabled | Enabled | Locked Out | Locked Out | Locked Out | Locked Out |
| Wait 30 Seconds | Enabled | Enabled | Locked Out | Locked Out | Locked Out | Locked Out |
| Enable #2 Loads | Enabled | Enabled | Enabled | Enabled | Locked Out | Locked Out |
| Wait 30 Minutes | Enabled | Enabled | Enabled | Enabled | Locked Out | Locked Out |
| During 30 Minutes Wait Period | Enabled | Enabled | Enabled | Enabled | Locked Out | Locked Out |
| Enable #3 Loads | Enabled | Enabled | Enabled | Enabled | Enabled | Locked Out |
| Low Frequency | Locked Out | Locked Out | Locked Out | Locked Out | Locked Out | Locked Out |
| Wait 30 Seconds | Locked Out | Locked Out | Locked Out | Locked Out | Locked Out | Locked Out |
| Enable #1 Loads | Enabled | Enabled | Locked Out | Locked Out | Locked Out | Locked Out |
| Wait 30 Seconds | Enabled | Enabled | Locked Out | Locked Out | Locked Out | Locked Out |

TABLE 2-continued

| | Sequence | | | | | |
|---|---|---|---|---|---|---|
| | #1 Loads | | #2 Loads | | #3 Loads | #4 Loads |
| | A/C | Contactor | A/C | Contactor | Contactor | Contactor |
| Enable #2 Loads | Enabled | Enabled | Enabled | Enabled | Locked Out | Locked Out |
| Wait 30 Minutes | Enabled | Enabled | Enabled | Enabled | Locked Out | Locked Out |
| During 30 Minutes | Enabled | Enabled | Enabled | Enabled | Locked Out | Locked Out |
| Utility Power Restored | Enabled | Enabled | Enabled | Enabled | Enabled | Enabled |

It can be appreciated that the above-described methodology allows for the transferring of the supply of electrical power from a utility source to a standby electric generator wherein a portion of the load on the generator may be shed in the event that the standby electric generator is overloaded. Programming the controller to execute the methodologies described herein is believed to be within the skill of the art.

Various modes of carrying out the invention are contemplated as being within the scope of the following claims particularly pointing out and distinctly claiming the subject matter which is regarded as the invention.

We claim:

1. A method of transferring electrical, power to a plurality of loads from a utility power supply that normally supplies power to the plurality of loads to an electric generator that supplies standby electrical power to the plurality of loads during interruption of the utility power supply, the method comprising:
   detecting an interruption of the delivery of utility power to the plurality of loads, wherein the plurality of loads includes a first priority load and a second priority load that are provided standby electrical power during interruption of the delivery of utility power;
   disabling the plurality of loads, for a preset wait period, upon interruption of utility power;
   after expiration of the preset wait period, enabling the first priority load without enabling the second priority load; and
   observing a preset delay period after enabling of the first priority load and enabling the second priority load upon expiration of the preset delay period;
   wherein the first priority load is disabled before the enabling of the second priority load.

2. The method of claim 1 wherein the first priority load is enabled for a user selected first load operating time.

3. The method of claim 2 wherein the user selected first load operating time is adjustable.

4. The method of claim 2 wherein the second priority load is enabled for a user selected second load operating time.

5. The method of claim 4 wherein the user selected second load operating time is adjustable.

6. The method of claim 4 wherein the user selected first load operating time and the user selected second load operating time are different.

* * * * *